(12) United States Patent
Perry

(10) Patent No.: US 6,618,002 B1
(45) Date of Patent: Sep. 9, 2003

(54) HF RADAR

(75) Inventor: Ken Perry, Maldon (GB)

(73) Assignee: Alenia Marconi Systems Limited, Chelmsford (GB)

( * ) Notice: Subject to any disclaimer, the term of this patent is extended or adjusted under 35 U.S.C. 154(b) by 0 days.

(21) Appl. No.: 09/672,730

(22) Filed: Sep. 28, 2000

(30) Foreign Application Priority Data

Sep. 30, 1999 (GB) .............................. 9923166

(51) Int. Cl.[7] .......................... G01S 13/06; G01S 13/72
(52) U.S. Cl. ...................... 342/107; 342/108; 342/115; 342/156; 342/157; 342/158
(58) Field of Search ............................ 342/59, 52, 56, 342/58, 107, 108, 115, 156, 157, 158, 175, 195, 74, 81

(56) References Cited

U.S. PATENT DOCUMENTS

| | | | | |
|---|---|---|---|---|
| 3,603,992 A | * | 9/1971 | Goggins, Jr. et al. ......... | 342/25 |
| 3,836,973 A | * | 9/1974 | Shnitkin et al. ............. | 342/362 |
| 3,898,657 A | | 8/1975 | Jensen ........................ | 342/107 |
| 4,823,136 A | | 4/1989 | Nathanson et al. .......... | 342/368 |
| 5,160,932 A | * | 11/1992 | Bull ............................ | 342/25 |
| 5,257,030 A | | 10/1993 | Aoki et al. .................. | 342/368 |
| 5,952,955 A | * | 9/1999 | Kennedy et al. ............. | 342/25 |

FOREIGN PATENT DOCUMENTS

| | | |
|---|---|---|
| EP | 0 172 094 A1 | 2/1986 |
| GB | 2 302 990 A | 2/1997 |

OTHER PUBLICATIONS

"Experimental trials on non-Gaussian environmental noise mitigation for surface-wave over-the-horizon radar by adaptive antenna array processing", Abramovich, Y.I, et al;Higher-Order Statistics, 1999. Procs. of the IEEE Sig. Proc'g Workshop on , p 340–344.*

"Reduction of interference by high power HF radar transmitters", Topliss, R.J.; Maclean, A.B.; Wade, S.H.; Wright, P.D.; Parry J.L.; HF Radio Systems and Techniques, Seventh International Conference on (Conf. Publ.No. 441), Jul. 7–10, '97 p: 251–255.*

"Using sources of opportunity to compensate for receiver mismatch in HF arrays", Fabrizio, G.A.; Gray, D.A.; Turley, M.D., Aerospace and Electronic Systems, IEEE Transactions on , vol.: 37 Issue: 1,Jan. 2001, p.(s): 310–316.*

"Parametric localisation of space–time distributed sources", Fabrizio, G.A.; Gran, D.A.; Turley, M.D. Acoustics, Speech, and Signal Processing, 2000. ICASSP '00. Proceedings. 2000 IEEE International Conference on , vol.: 5 , 2000, p.(s) 3097 3100.*

"Adaptive cancellation of nonstationary interference in HF antenna arrays", Fabrizio, G.A.; Abramovich, Y.I.; Anderson, S.J.; Gray, D.A.; Turley, M.D., Radar, Sonar and Navigation, IEE Proceedings—, vol.: 145 Issue: 1 Feb. 1998, p.(s): 19–24.*

"A new multibeam receiving equipment for the Valensole skywave HF radar: description and applications", Six, M.; Parent, J.; Bourdillon, A.; Delloue, J.,Geoscience and Kemote Sensing, IEEE Transactions on, vol.: 34 Issue: 3, May 1996, p.(s): 708–719.*

(List continued on next page.)

Primary Examiner—John B. Sotomayor
(74) Attorney, Agent, or Firm—Kirschstein, et al.

(57) ABSTRACT

A HF radar uses the same antenna array (414, 424, 424', 424') for both transmission (TX) and reception (RX). Each radiating element of the array may be driven by its own local transmitter and may have its own local receiver, both being connected to a central processor via fiber optic cables conveying digital data to the local transmitter relating to element energization in the TX mode and data representing signals received by the radiating elements in the RX mode. Each antenna element may have its own TX/RX unit, or a single TX/RX unit may serve two or more radiating elements. Each radiating element may comprise a skeletal pyramidal dipole mounted at ground level.

5 Claims, 8 Drawing Sheets

OTHER PUBLICATIONS

Kingsley, S., and S. Quegan, *Understanding radar systems*, McGraw–Hill, 1992, See Fig. 1.1 on p. 3 and accompanyign description.

http://www.britannica.com, "Component parts of a radar system" and associated Fig. 3. See arrangement of transmitter/receiver and duplexer system.

http://www.gsoft.com.au/ionospheric.htm, "HF/VHF Ionospheric Radar Systems", see description and block diagram of "standard radar system". Note that such radar systems have been used for several years.

* cited by examiner-

HF RADAR

BACKGROUND OF THE INVENTION

This invention relates to HF radar.

It particularly relates to RF radar installations consisting of arrays of receive/transmit modules and to modules for use in such installations.

As depicted in FIG. 1, whereas microwave radar is generally limited to line-of-sight surveillance. HF radar allows "over-the-horizon" surveillance to be made.

It is the practice in HF radar to provide different antennas for transmission and reception. FIGS. 2 and 3 depict an example of a prior art HF radar consisting of a transmitting antenna 20, receiving, antenna 30, RX/OPS cabin 32, TX/OPS cabin 22 and generator 34.

In order to provide the necessary directivity and radiation efficiency, the prior art HF radar utilises a transmitter antenna consisting of a conventional phased array. To obtain a satisfactory efficiency, the prior art has utilised relatively tall antennas so that the radiating elements are as high as possible. This has required the use of substantial bracing and/or substantial concrete foundations for each antenna element. To avoid excessive leakage of transmitted signal into the front end of the receiver, a discrete receiver antenna 30 is provided some distance from the transmit antenna array. The individual antenna elements of each array have also had to be disposed in accurate spatial relationship with each other. While this prior art arrangement has been found to be satisfactory in terms of its effectiveness as a radar, it does require the availability of a level site of substantial area and linear extent and the accurate spacing of the individual elements of the transmit antenna in particular. While such an arrangement may well be satisfactory for a permanent installation, it is not easily implementable as a mobile or temporary transportable installation which can be set up quickly on an unprepared site, or on poor, relatively weak, ground such as marshland or beaches. The present invention seeks to provide an arrangement in which the disadvantages of the prior art are at least ameliorated.

SUMMARY OF THE INVENTION

A first aspect of the invention provides a transmit/receive assembly for a HI radar apparatus, the transmit/receive assembly comprising a power transmitter for generating radio frequency signals, a receiver for receiving radio frequency signals and a duplexer arranged to couple the output of the power transmitter and the input of the radio receiver to a common port connection to a transmit/receive antenna.

A second aspect of the invention provides a transmit/receive antenna assembly comprising a transmit/receive assembly in accordance with the first aspect of the invention and an antenna.

A third aspect of the invention provides a HF radar comprising such transmit/receive assemblies or transmit/receive antenna assemblies.

BRIEF DESCRIPTION OF THE DRAWINGS

Embodiments of the invention will now be described by way of non-limiting example only, with reference to the drawings in which.

DETAILED DESCRIPTION OF THE PREFERRED EMBODIMENTS

Figure 1:
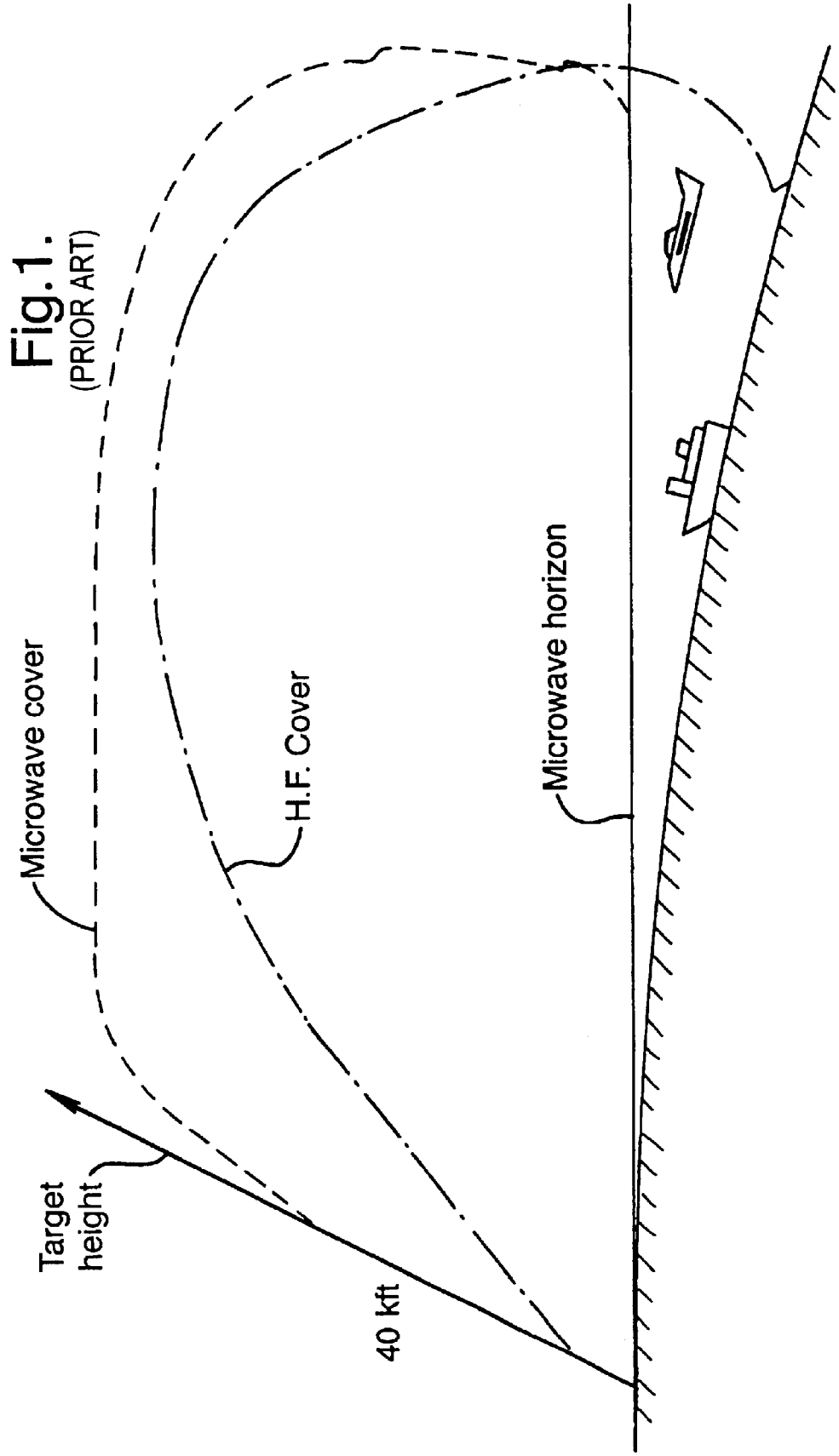
FIG. 1 illustrates typical vertical radar range characteristics of microwave and HF radars.
Figure 2:
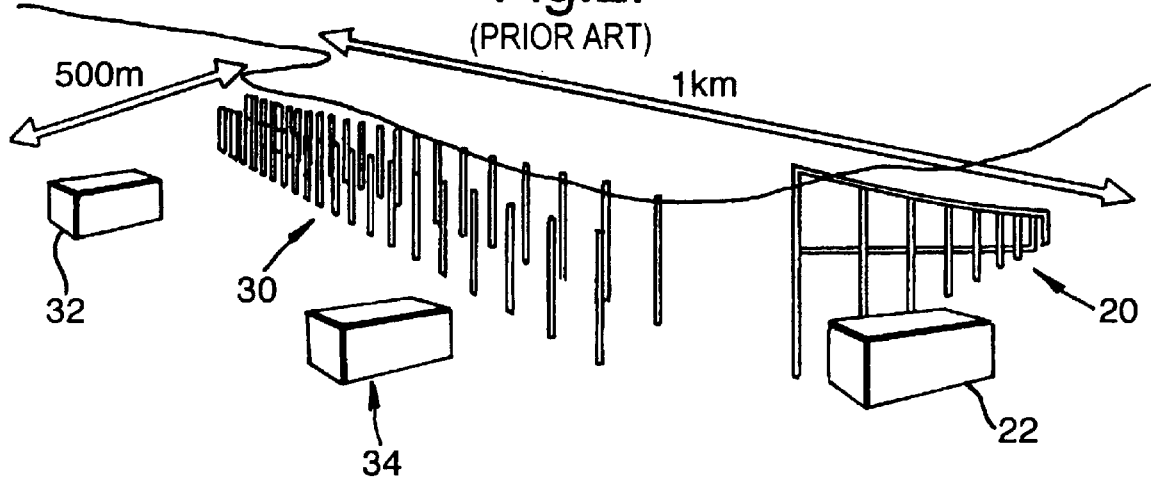
FIG. 2 shows a perspective view of a prior art HF radar installation.
Figure 3:
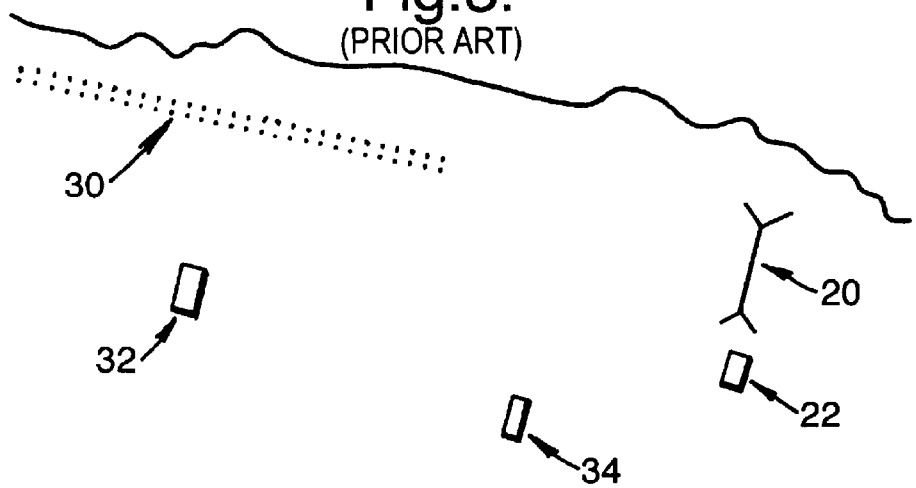
FIG. 3 shows a plan view of FIG. 2.
Figure 4:
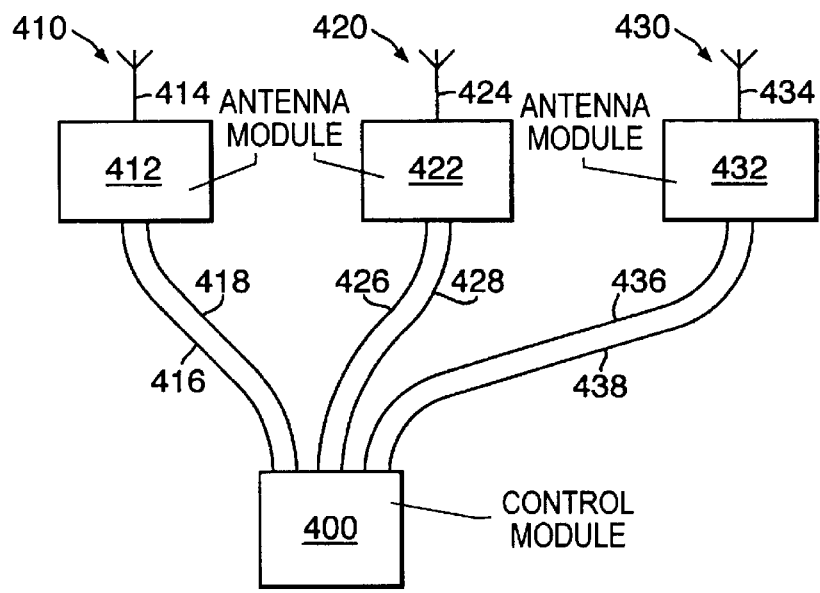
FIG. 4 shows a block diagram of an embodiment of the invention.

The HF radar installation shown schematically in FIG. 4 consists of a control module 400 and a plurality of antenna modules, only three of which 410, 420, 430 are shown. A plurality of transmit control lines 414, 424, 426 convey information from control module 400 to the antenna modules 412, 422, 432. A plurality of received data lines 418, 428, 438 convey information from the antenna modules 412, 422, 432 to the control unit 400. Each antenna unit consists of a respective antenna 414, 424, 434 and a respective transmitter/receiver module 412, 422, 432. All modules are identical.

Figure 5:
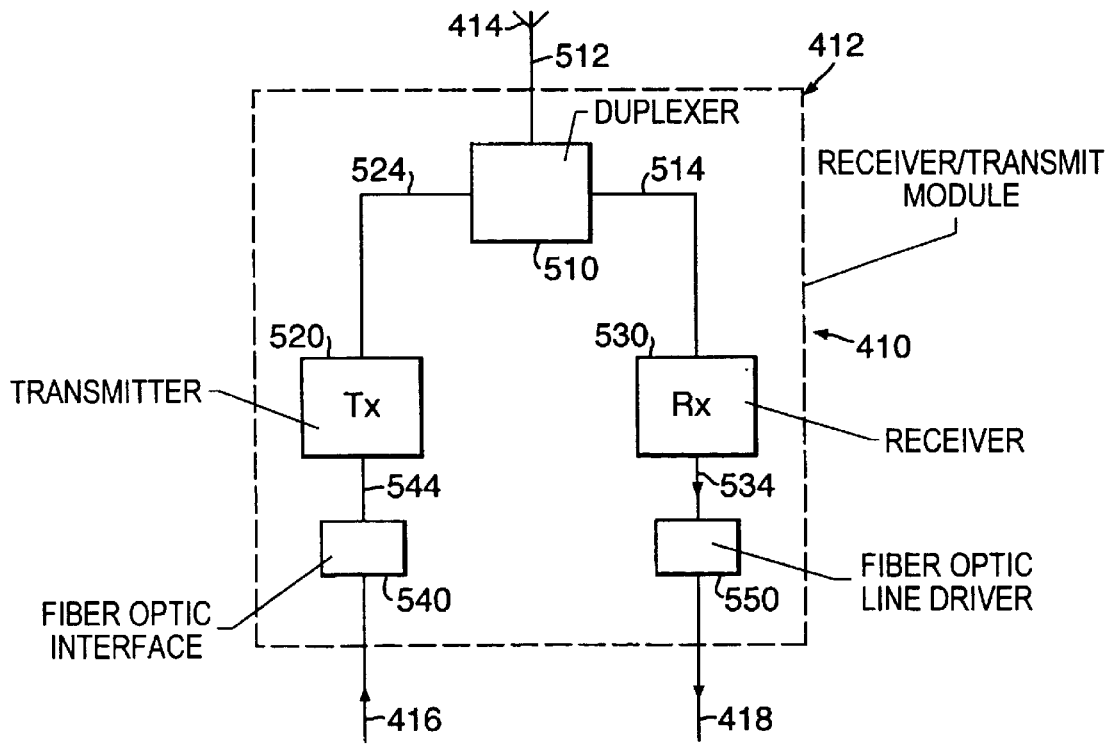
FIG. 5 shows a block diagram of one of the antenna modules of FIG. 4 in accordance with the invention.

One of the modules 412 will now be described with reference to FIG. 5. A receive/transmit module 410 has a HF transmitter 520 and a HF receiver 530. The transmitter 520 is coupled to a first port of a duplexer 510 via line 524. The receiver 530 is coupled to a second port of duplexer 520 via line 514. A third port of duplexer 520 is coupled to antenna 414 via line 512. Transmit control line 416 which in the present embodiment is a fibre optic cable, is coupled to transmitter 520 via a fibre optic interface 540 and line 544. A fibre optic received data line 418 is coupled to receiver 530 via fibre optic line driver 550 and line 534.

Operation of the embodiment will now be described. During a transmit phase the control module 400 sends instruction on lines 416, 426, 436 to the transmitters 520 of each module causing the transmitters of the modules to generate output signals in appropriate phased relationship with each other. These signals are fed to antennas 414, 424, 434 so that the signals emitted by the antennas coherently combine to generate a transmitted radio wave of desired properties in accordance with known principles of phased array antennas. During a receiving phase the transmitters are inhibited and signals received by antennas 414, 424, 434 are passed to their respective receivers 530 via respective duplexers 510. Information about the received signals is converted to digital form and conveyed to the control unit 400 via cables 418, 428, 438. The received information is processed to extract radar information therefrom in known manner. The extraction of such information is not part of the present invention and will not be described further.

The above described embodiment requires two links between the control unit and each antenna assembly. In a modification, not shown, this can be reduced to a single link by using multiplexers to provide two-way traffic via a single cable in known manner.

In general the transmitted signals will be regularly spaced signals of constant or predetermined duration and will have a fixed or predetermined relationship to each other.

Figure 6:
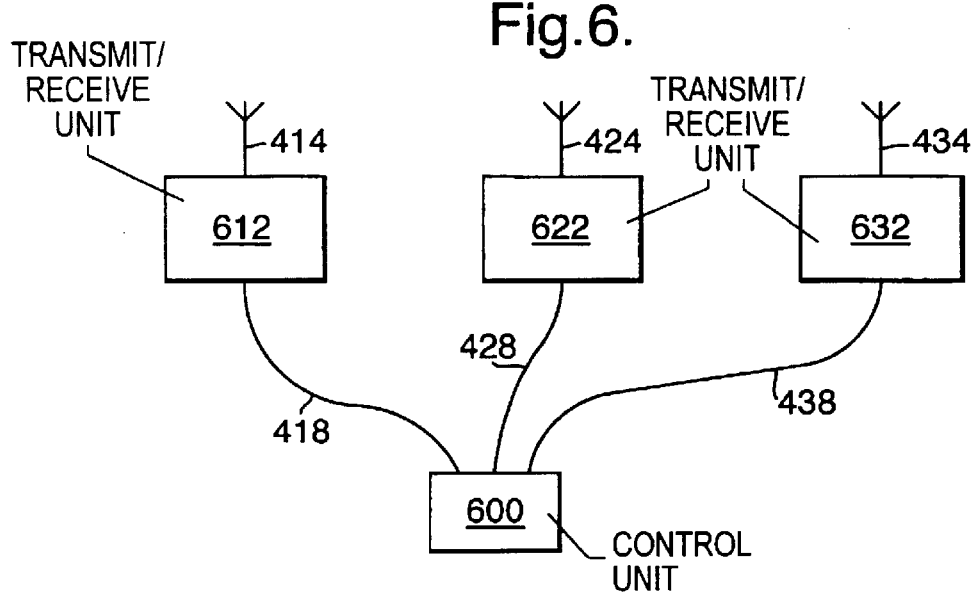
FIG. 6 shows a block diagram of a further embodiment of the invention.
Figure 7:
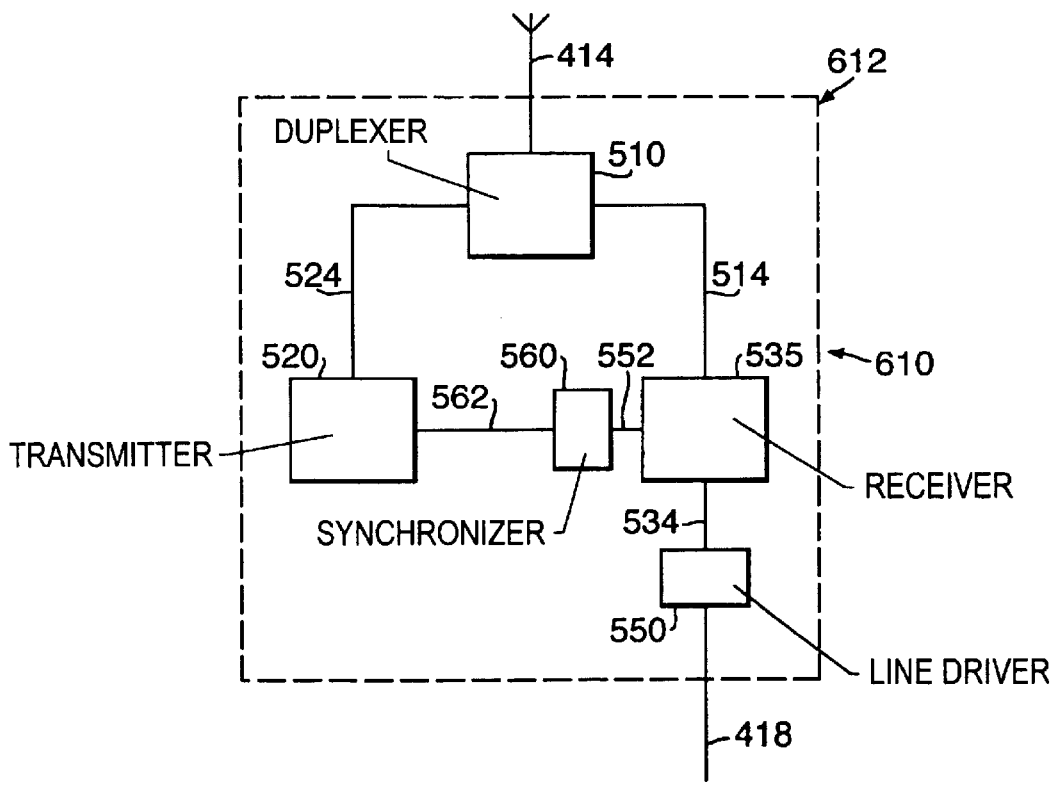
FIG.7 shows a block diagram of one of the antenna modules of FIG. 6 in accordance with the invention.

The radar assembly shown in FIGS. 6 and 7 utilise this property to eliminate the need for a discrete communication link between the control unit and the transmitters.

Items having the same functions and properties as in the previous embodiment have identical numbers and will not be described further.

Each transmit/receive unit 612, 622, 632 has a respective antenna 414, 424, 434 and is coupled to a control unit 600 via respective fibre optic cables 418, 428, 438.

Each unit 610 has a duplexer 510, and transmitter 520. A receiver 550 provides an output on line 534 to line driver 550 as in the previous embodiment. Receiver 550 also has a second output 552 responsive to a received signal from a previous transmission phase. This is passed via line 552 to synchroniser 560 which issues commands to transmitter 520 on line 562 instructing it when the next transmission cycle is to commence. This allows the transmitters to synchronise themselves to each other automatically.

Operation is otherwise as for the previously-described embodiment.

The previously described arrangements are robust in that each antenna unit is independently connected to the control unit and breakage or function of one connecting line only affects that antenna unit. However it does require a considerable amount of cabling especially where an array having a larger amount of elements is used.

Figure 8:
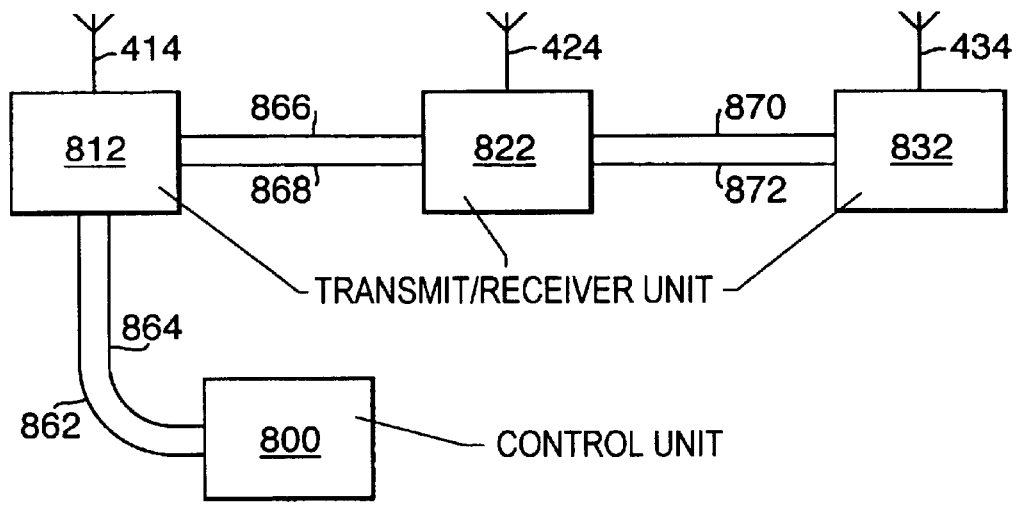
FIG. 8 shows a block diagram of a still further embodiment of the invention.
Figure 9:
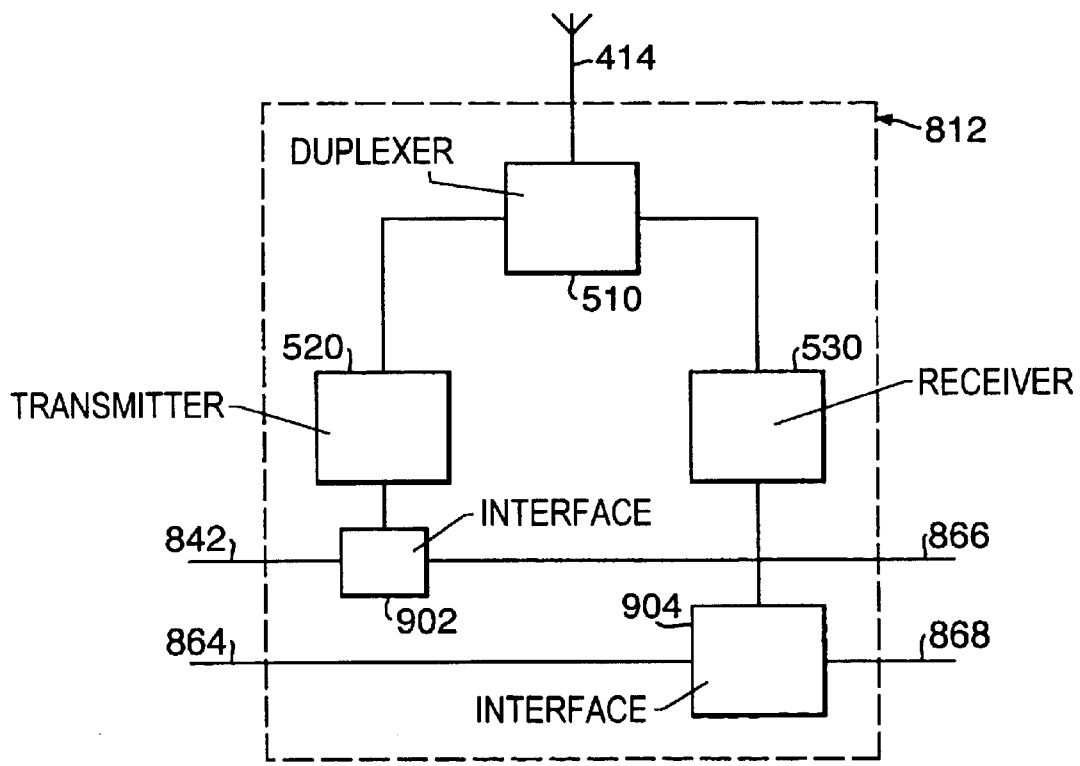
FIG. 9 shows a block diagram of one of the antenna modules of FIG. 8 in accordance with the invention.

The arrangement shown in FIGS. 8 and 9, while not as robust, allows considerable economy in cabling to be attained. In this embodiment the antenna units 812, 822, 832 and control users are "daisy-chained" together via cables 862, 864, 866, 868, 879, 872. Each modules 812, 822, 832 has a serial data bus interface 902, 904 for extracting data from the control unit and conveying it to the transmitters 520 and for supplying information from receivers 530 to the control unit 800. These interfaces 902, 904 operate in conventional manner and will not be described further.

Figure 10:
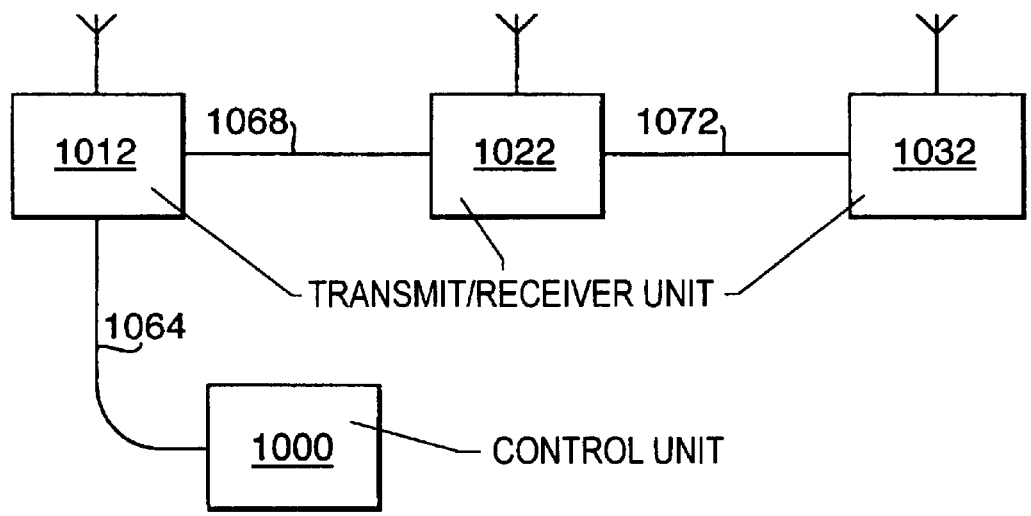
FIG. 10 shows a block diagram of a yet further embodiment of the invention.
Figure 11:
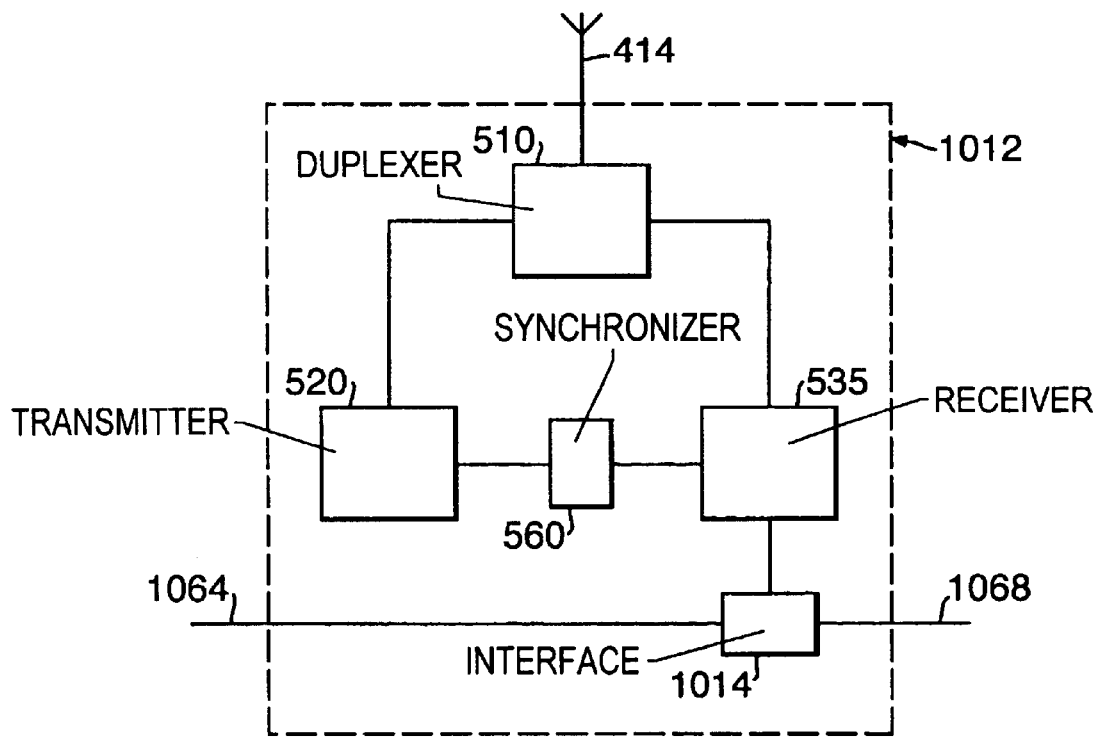
FIG. 11 shows a block diagram of one of the antenna modules of FIG. 10 in accordance with the invention.

The arrangement shown in FIGS. 10 and 11 corresponds with the array of FIGS. 7 and 8 but daisy-chained in the manner described above in connection with FIGS. 8 and 9. Each antenna unit 1012, 1022, 1032 has a single interface unit 1014 to allow received information to be arranged to the control unit 1000. Operation is otherwise as described with reference to FIGS. 7 and 8 and will not be described further.

The above-described embodiments omitted the source of power of the modules in the interest of clarity. For a permanent installation having a source of mains supply each module car have its own mains-powered power supply. For field use or temporary installations, each module could have its own relatively small power source eg. a motor/generator set. Alternatively one or more relatively large generator sets could be used, power being supplied to the modules by conventional power cables.

It may be convenient to physically locate two or more modules in a common enclosure so as to reduce the number of cables between the various system components.

For example, only a single power cable is then required to provide power to all the modules physically located in the common enclosure and the digital output signals from the receivers in the common enclosure can be multiplexed on a single fibre optic cable in known manner.

Alternatively a single amplifier may be used to supply RF energy to all antennas coupled to the module, the RF input lines 524 of each coupler 510 being coupled in parallel to the single RF source output in known manner instead of having their own individual RF source 520 etc.

Figure 12:
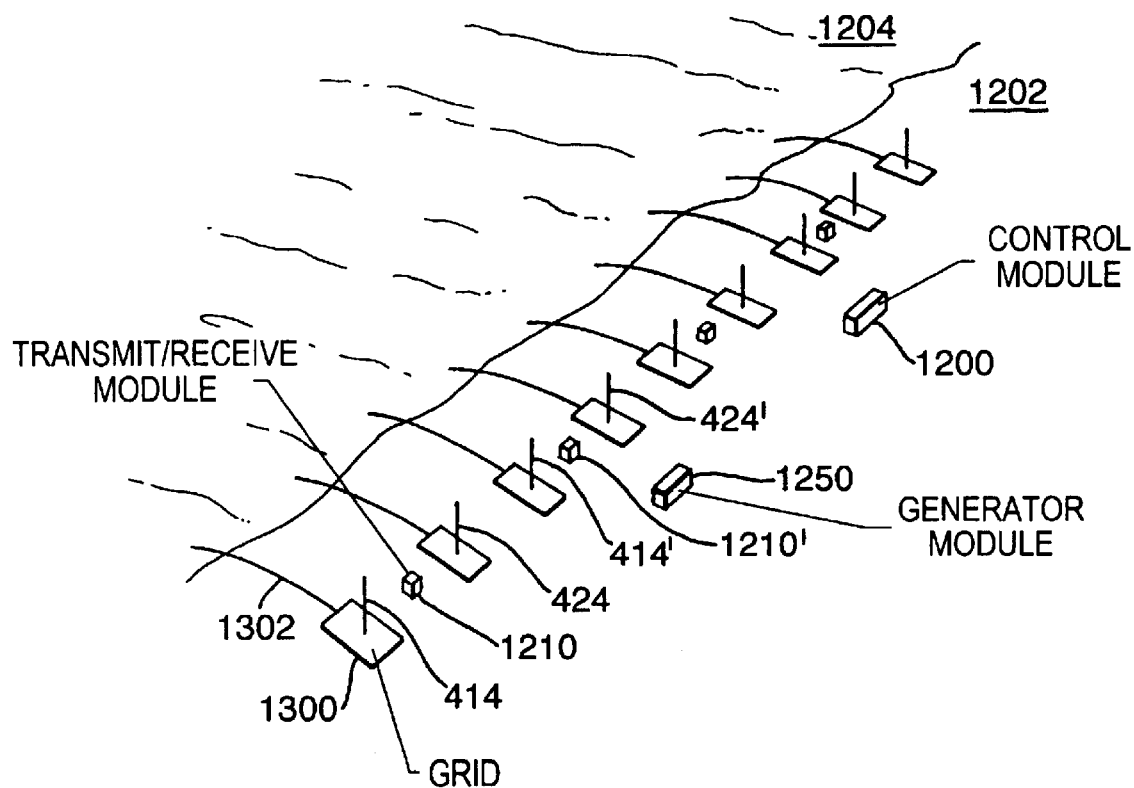
FIG. 12 shows a perspective view of a HF radar installation in accordance with the invention.
Figure 13:
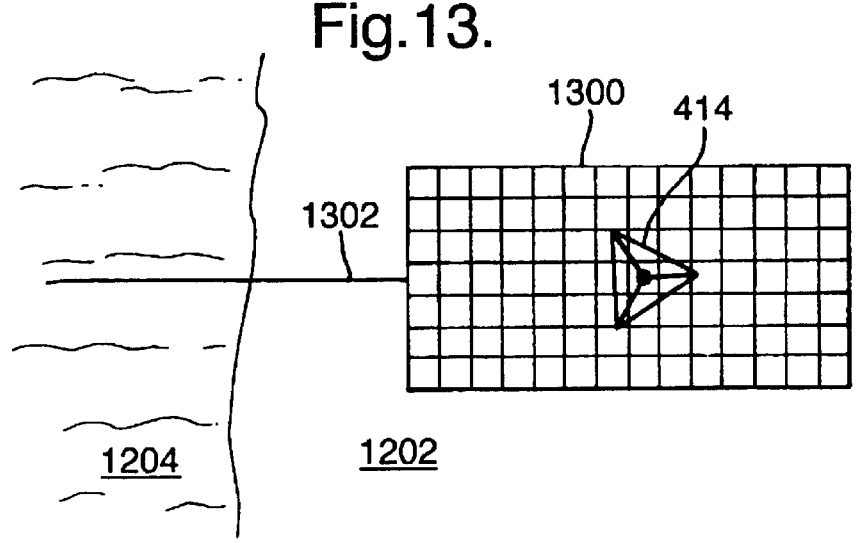
FIG. 13 shows a plan view of one of the antennas of FIG. 12 on an enlarged scale.

FIGS. 12 schematically depicts part of a coastal installation in which each transmit/receive module 1210 supplies two antennas 414, 424. The array of antennas 414, 424; 414', 424' is located on beach material 1202 adjacent a body of water 1204. As shown in more detail in FIG. 13, because dry beach material generally has poor electrical conductivity. Each antenna is placed on a respective propagation mat consisting of grid 1300 of electrically conductive material such as metal wire. Each grid 1300 is electrically connected to the body of water by one or more respective electric cables 1302. For the purposes of illustration, and in the interest of clarity, only one cable is shown in the figure, but additional cables may be provided in electrical parallel, possibly running in different directions and terminating at different locations in the body of water, according to system requirements.

The provision of such propagation mats, while not essential to the invention, has been found advantageous with certain types of antenna on ground having poor electrical conductivity, but is not normally necessary on soils of good electrical conductivity.

Control module 1200 contains signal processing circuitry and displays to process and display information received by the antennas.

Each module 1210 is physically located between its respective antennas 414, 424. Power for the modules is obtained from generator modules 1250, only one of which is shown for clarity. The cabling between generator modules transmit/receive modules and the control module 1200 has been omitted for clarity.

Figure 14:
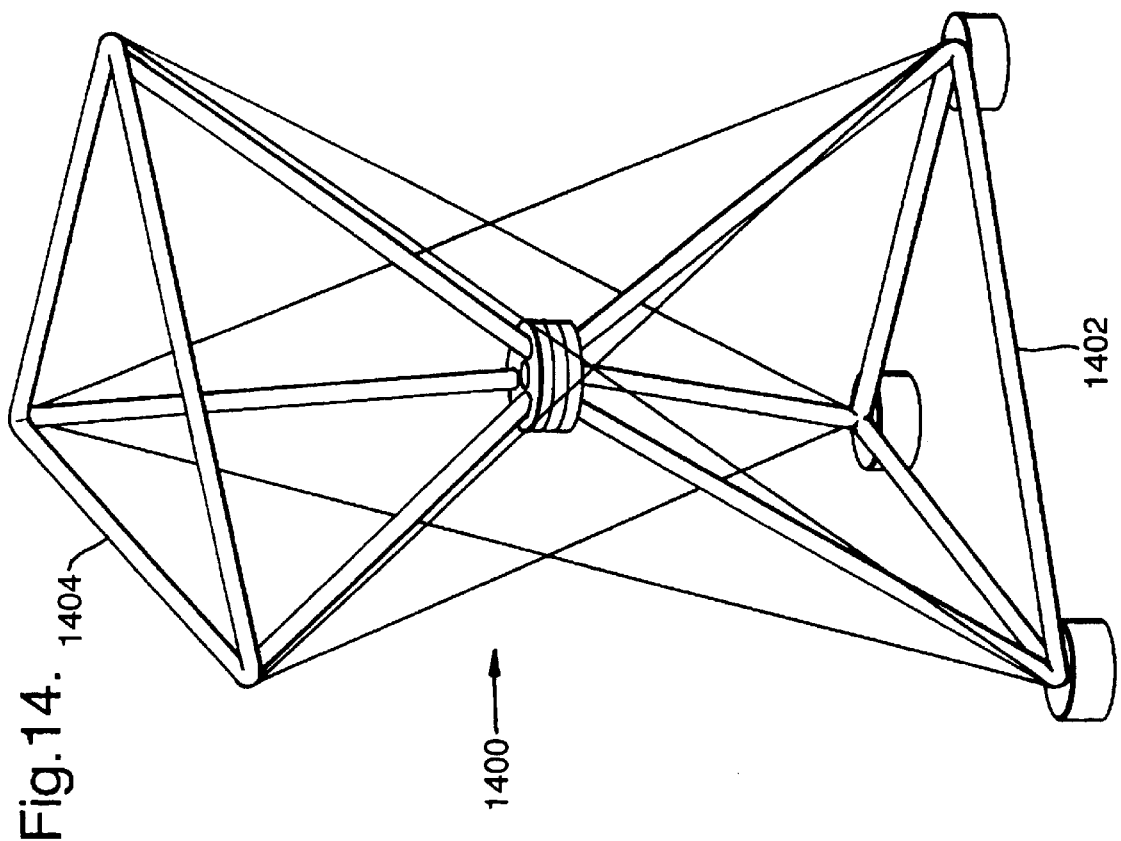
FIG. 14 shows an antenna for use with the invention.

FIG. 14 shows a perspective view of an antenna suitable for use with the invention. The antenna 1400 is a centre-fed dipole antenna having a lower radiating element 1402 and an upper radiating element 1404. This antenna is described in UK patent GB 2302990B to which reference should be made for further details.

Figure 15:
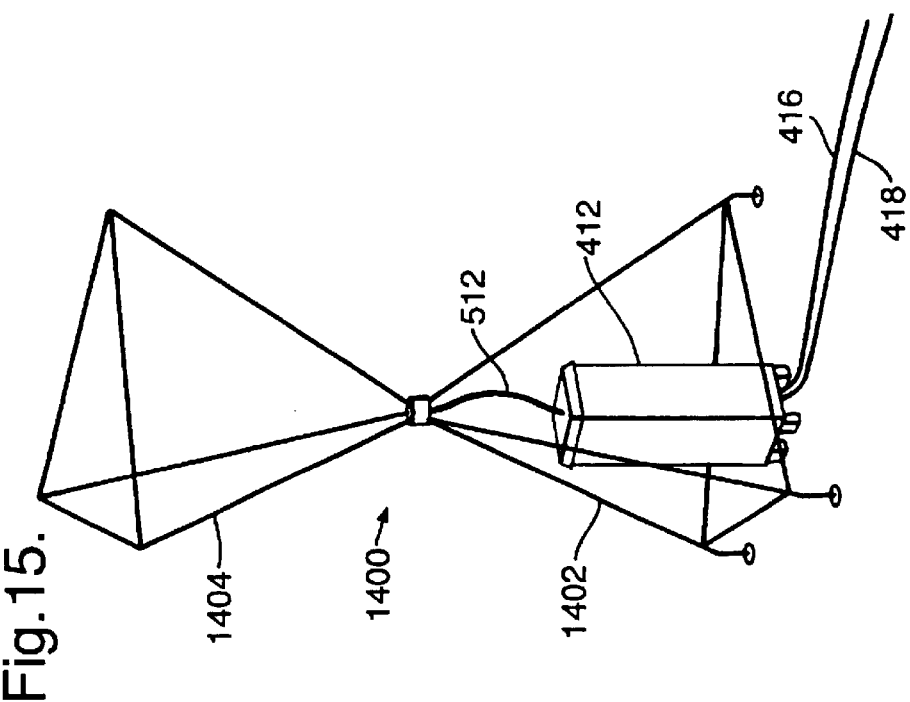
FIG. 15 shows an antenna module in accordance with the invention.

FIG. 15 shows a perspective view of an antenna module consisting of an antenna 1400 of the type illustrated in FIG. 14 and a transmit/receive module 412. The bracing of the antenna has been omitted for clarity. In this embodiment a transmit/receive module 412 is physically located within the lower radiating element 1502 of the antenna. This has the advantage of only requiring a relatively short length of cable 512 between the transmit/receiver module 412 and the antenna feed point, with an attendant reduction in signal loss which would otherwise occur were the antenna fed from a central transmitter via a long length of cable. In field use, the weight of the transmit/receive module can be utilised to stabilise the antenna, for example by guy ropes or halyards (not shown) extending from the module to suitable anchor points on the antenna or, if the antenna and the transmit/receive module 412 both rest on a platform or skeletal platform, by virtue of its weight. Connections to and from the module are routed under the lower edge of the lower element 1402 of the antenna and therefore do not interfere with the antenna's electrical performance.

However, it is not essential for the transmit/receive module to be physically located within the lower radiating element and it may equally well be located elsewhere, such as between adjacent antennas as in the FIG. 12 embodiment, or beneath the antenna.

A number of modifications are possible within the scope of the invention.

While the type of antenna element illustrated in FIG. 14 has been found to give good results the invention is not limited thereto and any other type of antenna element capable of being used for both transmission and reception can be employed.

While the described data links comprise fibre optic cables, other transmission media such as conventional coaxial cables or twisted pair transmission lines carrying conventional electrical signals may be employed.

While grouping a number of units together in one relatively loose enclosure can result in economy of manufacture and can reduce the number of interconnections between enclosures, providing each antenna with its own smaller module means that each module is relatively light. This can be important in a transportable installation intended for temporary or field use where modules have to be positioned. Providing a number of discrete modules also makes the system more robust as damage to one module only affects one element of tire array.

I claim:

1. A high frequency (HF) radar installation, comprising:
   a) a transmit/receive antenna having an array of antenna elements, each antenna element comprising a dipole antenna including first and second skeletal pyramids disposed such that an apex of one of the pyramids is adjacent to an apex of the other of the pyramids, the pyramids having at least individual edges comprising electrically conductive members, and stay means for maintaining the conductive members in a predetermined spatial relationship with each other; and
   b) a plurality of transmit/receive assemblies, each assembly including, for each antenna element, a power transmitter for generating radio frequency signals, a receiver for receiving radio frequency signals, and a duplexer for coupling an output of the power transmitter and an input of the receiver to a common port to the transmit/receive antenna.

2. The HF radar installation as claimed in claim 1, further comprising means for converting output signals from the receiver to digital form.

3. The HF radar installation as claimed in claim 1, further comprising a control module and means for coupling the signals received by the respective receivers to the control module.

4. The HF radar installation as claimed in claim 3, further comprising means for synchronizing operation of the power transmitters such that the respective transmitter outputs are coupled to their associated antenna elements in a predetermined temporal relationship to each other.

5. The HF radar installation as claimed in claim 3, in which each transmit/receive assembly includes synchronizing means coupled to an output of its respective receiver, and responsive to reception of a radar signal originating from the radar installation, and operative for causing transmission of a further signal by the power transmitter at a time related to a time of said reception of the radar signal.

* * * * *